United States Patent [19]

Momchilov

[11] 4,023,268

[45] May 17, 1977

[54] METHOD OF PRODUCING VENT HOLES IN TIRE MOLDS

[76] Inventor: Paul G. Momchilov, 424 Seville Road, Wadsworth, Ohio 44281

[22] Filed: Jan. 26, 1976

[21] Appl. No.: 652,070

[52] U.S. Cl. .............................. 29/527.6; 164/108; 164/112; 425/28 D; 425/812
[51] Int. Cl.² ......................................... B22D 31/00
[58] Field of Search .......... 164/108, 112, 234, 333, 164/410; 425/28 D, 812; 29/527.6

[56] References Cited

UNITED STATES PATENTS

| | | | |
|---|---|---|---|
| 2,756,460 | 7/1956 | Heintz | 425/28 D |
| 2,848,910 | 8/1958 | Bastian | 425/812 X |
| 3,213,534 | 10/1965 | Swanke | 164/112 |
| 3,439,732 | 4/1969 | Andreoli | 164/112 |

FOREIGN PATENTS OR APPLICATIONS

| | | | |
|---|---|---|---|
| 358,626 | 10/1931 | United Kingdom | 164/108 |
| 1,166,182 | 10/1969 | United Kingdom | 425/28 D |

Primary Examiner—John E. Roethel
Attorney, Agent, or Firm—Baldwin, Egan, Walling & Fetzer

[57] ABSTRACT

A tire mold and method for producing vent holes therein comprising placing metal tubing in the desired locations on a female core for producing the tire mold, which after the casting metal is poured onto the core, encompasses the metal tubing leaving a vent hole in the metal of the tire mold at the respective tubing, after which the core material is removed. This eliminates conventional practice of drilling vent holes in a tire mold and provides for vent holes in areas heretofore inaccessible.

8 Claims, 16 Drawing Figures

METHOD OF PRODUCING VENT HOLES IN TIRE MOLDS

This invention relates in general to molds with vent holes therein, and more particularly relates to a tire mold and associated method of manufacture utilizing tubing means placed on the core mold used in the formation of the tire mold, and pouring molten metal onto the core to form the tire mold, whereby the tubing means provides preformed vent holes at predetermined locations in the tire mold after the molten metal solidifies.

BACKGROUND OF THE INVENTION

Venting of a tire mold has been heretofore usually accomplished by drilling vent holes into the mold after formation of the latter. These drilling operations were not only relatively costly and time consuming, but also in many instances desired locations for vent holes were inaccesssible to a drilling operation.

SUMMARY OF THE INVENTION

The present invention provides a tire mold and a method for producing vent holes therein by inserting tubing into or onto the female core utilized in the formation of the tire mold, and then pouring the casting metal onto the core, permitting it to harden and thus encapsulate the tubing, thereby providing preformed vent holes in the tire mold.

Accordingly, an object of the invention is to provide a vented tire mold and a novel method for producing the same.

Another object of the invention is to provide a method of producing a vented tire mold by placing vent means in the desired locations in the female core used in the formation of the tire mold, and then pouring molten metal onto the core around the vent means to entrap the vent means in the metal, and then permitting the metal to solidify thus resulting in preformed vents.

Another object of the invention is to provide a method of the above described type which includes the formation of means on the core for supporting and positioning the vent means thereon.

A still further object of the invention is to provide a vent means for a tire mold which comprises tubing which can be readily inserted into the female core used in the formation of the tire mold, so that upon pouring of the tire mold the vent is preformed in the mold by the tubing.

Other objects and advantages of the invention will be apparent from the following description taken in conjunction with the accompanying drawings wherein:

DESCRIPTION OF PREFERRED EMBODIMENTS

Figure 1:
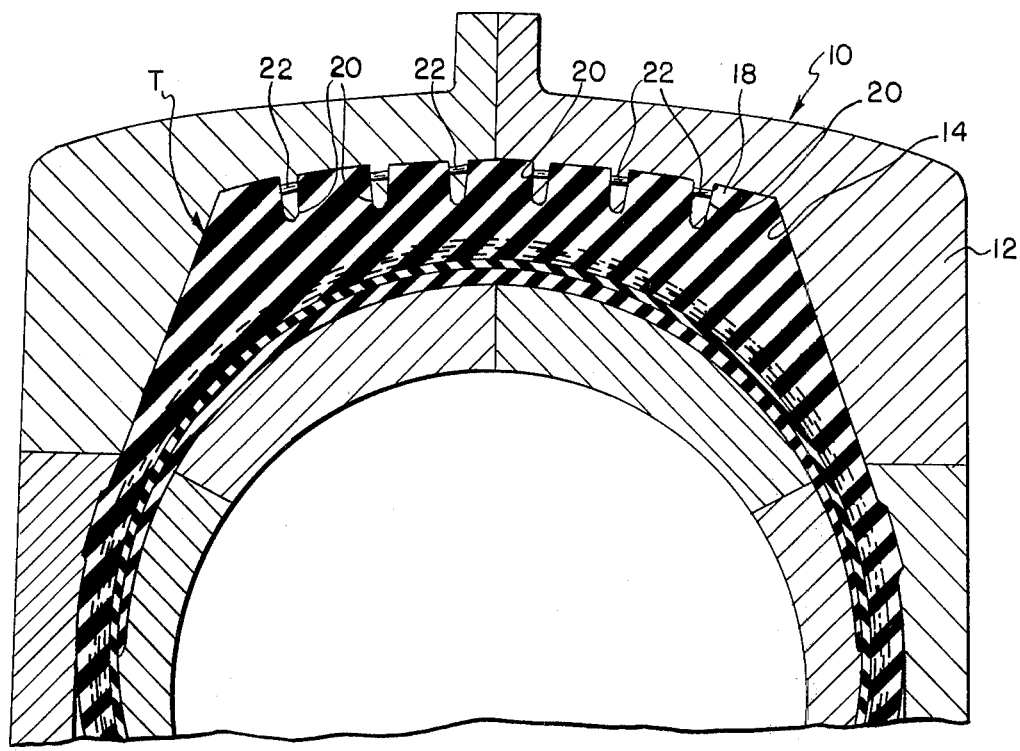
FIG. 1 is a fragmentary, generally diagrammatic, vertical sectional view of a tire mold showing the tire formed therein, and illustrating the vents in the tread producing projections of the tire mold.

Referring now to FIG. 1, there is illustrated a portion of a tire mold 10 which in the embodiment illustrated is of sectional configuration, comprising a sectional body portion 12 defining a mold cavity 14, for formation of a pneumatic tire using conventional molding techniques well known in the art. The tread 18 of the tire T is formed by the projections 20 on the mold 10, projecting inwardly of the mold cavity 14, during the tire forming operation.

One or more of such tire mold projections 20 embody vent openings 22 extending in the embodiment illustrated transverse of the respective projection. Such vent openings may conventionally be from a few thousandths to 1/16 inch or more in internal diameter, and in the prior art, are conventionally provided by drilling through the projections after the formation of the tire mold is completed with the predetermined tread design of the tire.

Figure 2:
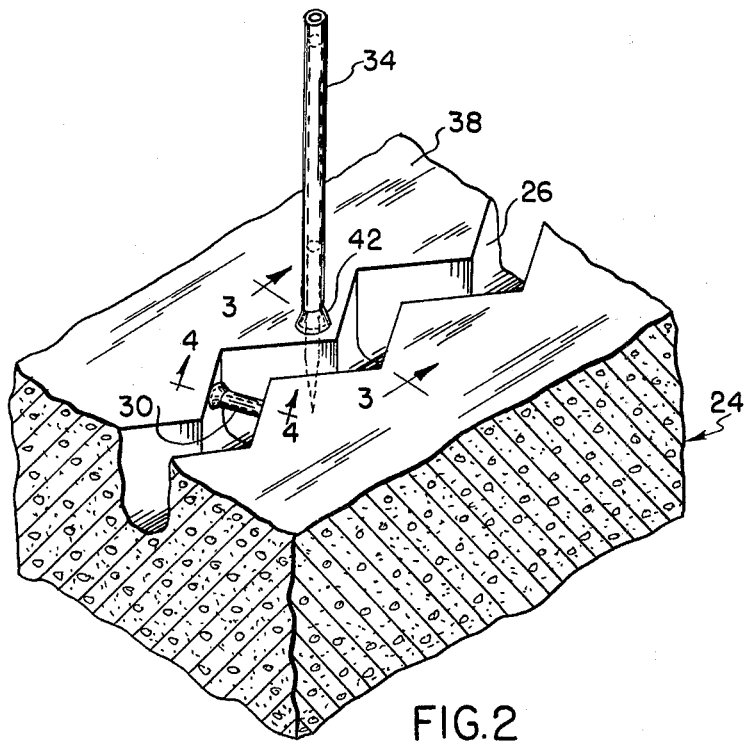
FIG. 2 is a fragmentary sectional view of a portion of the female core used in the formation of the tire mold, and illustrating vent tubing positioned thereon and therein, for providing vents in the finalized tire mold.

Upper body portion 12 of the tire mold is formed by casting molten metal onto a female core 24 (FIGS. 2, 3 and 4) which may be made of sand or any other suitable core material, and which embodies therein the tread design cavities 26, for formation of the aforementioned projections 20 on the tire mold per se.

In accordance with the present invention, in order to form the aforementioned vent openings 22 in the projections 20 of the tire mold, tubing elements 30 (FIGS. 2 and 5) are placed manually using the operator's fingers, or alternatively some instrument, into the tread cavities 26, and located therein in predetermined position. In this connection, projections 32 (FIG. 4) may be inwardly formed on the defining side surface of the tread cavities at predetermined locations, for positioning and supporting a respective tubing element 30 in proper position in the core cavity.

Figure 3:
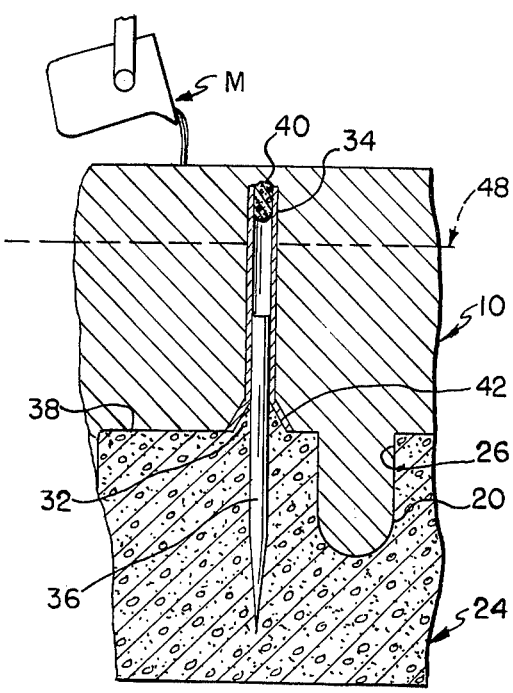
FIG. 3 is an enlarged vertical sectional view taken generally along the plane of line 3—3 of FIG. 2, illustrating the female core with the metal for producing the tire mold having been poured onto the core in the process of producing a tire mold.
Figure 4:
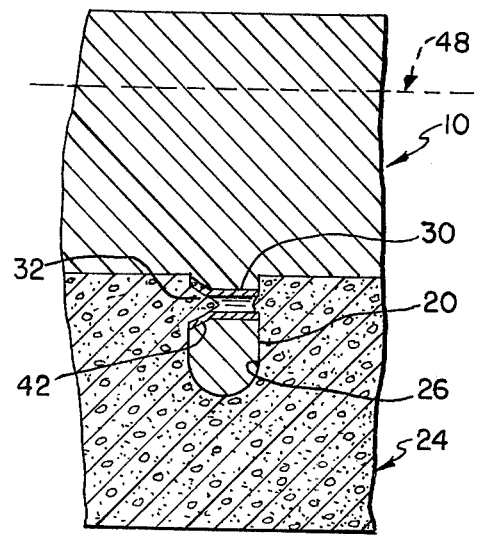
FIG. 4 is a sectional view generally similar to FIG. 3, but taken generally along the plane of line 4—4 of FIG. 2 looking in the direction of the arrows.
Figure 9:
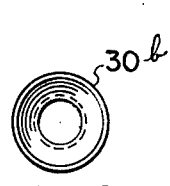
FIGS. 9 and 9A are respectively end and side elevational views of another embodiment of tubing element.
Figure 9A:
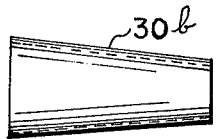
Figure 10:
FIGS. 10 and 10A are respectively end and side elevational views of a further embodiment of tubing element.
Figure 10A:
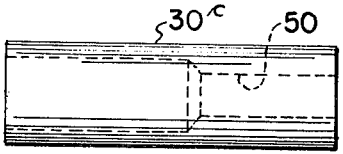
Figure 11:
FIGS. 11 and 11A are respectively end and side elevational views of another embodiment of tubing element.
Figure 11A:
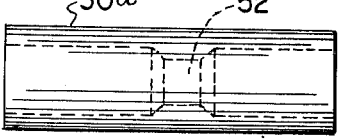
Figure 12:
FIGS. 12 and 12A are respectively end and side elevationalviews of a still further emobodiment of tubing element.
Figure 12A:
Figure 5:
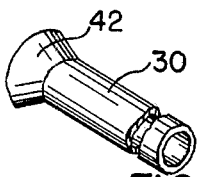
FIG. 5 is an enlarged, broken, perspective view of one of the tubing elements used in providing a vent, and adapted for insertion into or onto the female core for providing a vent in the finalized tire mold.

In order to form vertical vents in the body 12 of the tire mold, tubing elements 34 may be provided (FIG. 3). Tubing elements 34 may be oriented with respect to the core 24 by means of pins 36 inserted into the core material as illustrated, which pins are adapted to extend upwardly above the upper level 38 of the core 24, and are received interiorly of the respective tubing element 34 a sufficient distance to stabilize the respective tubing element in position on the core 24. Accordingly, when the molten metal is poured as illustrated at M onto the female core disposed in a conventional foundry mold, the flow of metal will not disturb or distort the orientation of the vertical tubing elements. As can be seen, the upper end of the tubing element 34 may be sealed as by means of a plug 40 of core material to prevent molten metal from flowing internally of the tubing element 34. As can be seen, both the tubing elements 30 and the tubing elements 34 may be flared at 42 at one end thereof, and may be adapted for coaction with a respective core projection 32, for aiding in positioning the respective tubing element on the core, and holding it in position for being encapsulated by the molten metal. As can be seen in FIGS. 3 and 4, when the molten metal is poured onto and into the female core, it encapsulates or encompasses the respective tubing element or elements, and upon hardening or cooling of the metal, the tubing element is permanently encapsulated in the metallic tire mold.

The tubing elements 30, as can be seen in FIG. 4, extends from one side of the respective projection 20 to the other side thereof, to provide an effective vent while the vertical tubing elements 34 extend outwardly above the machining line 48, to which the tire casting is subjected after solidification thereof, so that the upper end of the vertical tubing element 34 is exposed, thereby providing a vent.

Figure 6:
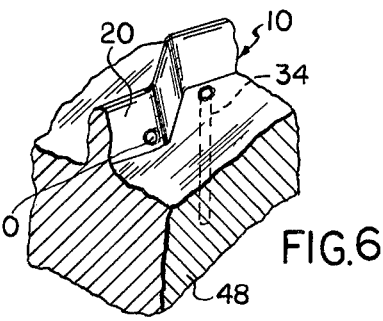
FIG. 6 is a fragmentary view of a portion of the tire mold with one of the tread forming projections, and illustrating vents thereon.

It will be seen that upon removal of the core material 24 from the tire casting, the latter is left with the tread forming projections having vent tubing 30 therein and vertical vent tubing 34 opening onto the top or machine surface 48 thereof, as shown for instance in FIG. 6. Accordingly, when the tire mold is used in the formation of the tire as shown in for instance in FIG. 1, the vents provide for exhaustion of gases produced upon formation of the tire material.

While it is possible to use various types of tubing material for the vents, brass tubing has been found to be highly satisfactory which tubing may have an internal diameter dimension within the range of 0.040 thousandths to about 0.0625 thousandths of an inch and a wall thickness of approximately 0.008 thousandths of an inch. Generally speaking the molten metal, if it is aluminum, is at a temperature of no greater than about 1,400° F. when it is poured into the mold containing the female core. When the metal is other than aluminum, different metal temperatures, of course, are utilized, and which may necessitate the use of other tubing materials instead of brass, and as for instance stainless steel.

Figure 7:
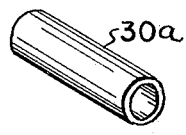
FIG. 7 is a perspective view of another embodiment of tubing element for producing a vent in the finalized tire mold.
Figure 8:
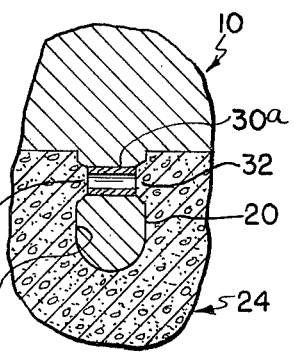
FIG. 8 is a fragmentary sectional view generally similar to FIG. 4, but illustrating the tubing element of FIG. 7 embedded in the poured tire mold projection.

FIGS. 7 and 8 show a tubing element 30a which is non-flared at an end thereof, and which may be embedded in the projection 20 of the tire mold similarly to the first described embodiment, and as shown in FIG. 8. Core projections 32 on both sides of the tread cavity may be provided, as shown, for aiding in locating the tubing element in the cavity.

FIGS. 9 through 12A illustrate other embodiments of tubing elements, useable in providing for venting of a tire mold as aforedescribed. Tubing element 30b is tapered throughout its length. Tubing element 30c has a constricted passageway section 50 through a portion thereof. Tubing element 30d has a constricted passageway section 52 generally centrally located, and tubing element 30e is formed of relatively axially slidable sections 54, 54a, for adjustability in the length of the tubing element. Sufficient frictional coaction exists between the telescoping sections 54, 54a so that they tend to remain in whatever adjustable position they are placed.

From the foregoing description and accompanying drawings, it will be seen that the invention provides a novel tire mold and a method for producing vent holes therein, wherein the vent holes are provided by inserting metal tubing into a desired location in and/or on the female core utilized for producing the tire mold, after which the casting metal is poured into the core which metal generally encapsulates the metal tubing leaving a vent hole in the cast metal after the molten metal has solidified and the female core material is removed, thus eliminating conventional practice of drilling vent holes into a tire mold.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. A method of producing vent holes in a tire mold made by foundry metal casting processes comprising, forming a female core material having cavities therein defining the tread configuration of a tire, placing extendible tubular means in the cavity portions and extending said tubular means into engagement with the confronting surfaces of the tread forming cavity to orient the tubular means in a desired location in the female core, pouring metal into the cavity portions of the female core so as to produce a tire mold with projections being formed from the solidified metal of the cavity portions wherein the extendible tubular means are encapsulated within the metal projections to provide vent holes, and then removing the core material from the mold leaving the mold with the tread forming projections thereon.

2. In a method for producing vent holes in tire molds produced by foundry metal casting processes comprising the steps of placing vent means in the desired location in the female core used in formation of the tire mold, and then pouring metal onto the core around the vent means to entrap the vent means in the metal, permitting the metal to solidify whereby at least one vent hole results at the vent means, and then removing the female core material, resulting in a tire mold having vent means integrally formed therein, and including providing an extensible vent means and orienting the latter generally horizontally in a tread forming cavity of the female core and then extending said vent means into engagement with the confronting surfaces of the tread forming cavity to orient the vent means in said desired location in the female core prior to said pouring.

3. A method in accordance with claim 2 wherein said vent means comprises a tubular element inserted in said female core, and including providing means for positioning the tubular element preparatory to said pouring and solidification of the metal therearound.

4. A method in accordance with claim 3 wherein said providing said support means includes the step of flaring the end of the tubing element used as the inserted vent and providing a complementary mounting projection on th female core for coaction with said flared end, for mounting the tubing element in predetermined positional relationship at the desired location in said female core.

5. A method in accordance with claim 3 wherein said vent means comprises a further tubular element, and mounting a pin in the female core projecting upwardly from the latter, and then sliding said further tubular element over said pin so as to locate the vent defined thereby prior to the pouring of the casting metal into the female core.

6. A method in accordance with claim 5 including the step of machining the exterior of the resultant tire mold after said metal solidification wherein said further tubular element is exposed.

7. A method in accordance with claim 2 including the step of providing brass tubes which form the vent means for insertion into the female core.

8. A method in accordance with claim 2 wherein the casting metal is at a temperature of no more than 1,400° F. when said pouring occurs into said female core.

* * * * *